United States Patent Office 3,499,896
Patented Mar. 10, 1970

3,499,896
TRIAZINYL-ANTHRAQUINONE DYESTUFFS
Rutger Neeff, Leverkusen, Germany, assignor to Farbenfabriken Bayer Aktiengesellschaft, Leverkusen, Germany, a corporation of Germany
No Drawing. Filed June 8, 1967, Ser. No. 644,475
Claims priority, application Germany, June 15, 1966,
F 49,473
Int. Cl. C07d 55/20
U.S. Cl. 260—249
10 Claims

ABSTRACT OF THE DISCLOSURE

Anthraquinone dyestuffs containing an α-amino-triazine substituent wherein the triazine ring is substituted by alkoxy, aralkoxy, alkenyloxy, aralkenyloxy, or cyclohexoxy groups, are useful for dyeing synthetic fiber materials.

DISCLOSURE

This invention relates to novel anthraquinone dyestuffs and to methods of dyeing and printing of synthetic fibre materials with such dyestuffs.

The novel anthraquinone dyestuffs are compounds of the formula:

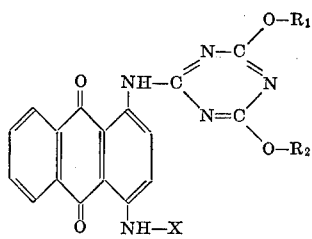

in which $R_1$ and $R_2$, which can be the same or different, stand for unsubstituted or substituted alkyl, alkenyl or aralkyl radicals of 1 to 18 carbon atoms and X stands for an unsubstituted or substituted aryl group of 6 to 18 carbon atoms.

If $R_1$ and/or $R_2$ are alkyl groups, those alkyl groups are preferred which contain 1 to 6 carbon atoms. They may be substituted, for example, by one or more and preferably from one to three of the following type: halogen atoms; hydroxy, alkoxy, hydroxy-alkylene-oxy, alkoxyalkylene-oxy, alkoxycarbonyl or cyano groups; or by amine groups which may in turn be substituted by alkyl, hydroxyalkyl, alkoxy-alkyl or cyano-alkyl radicals. Examples of the unsubstituted or substituted alkyl groups are the methy, ethyl, propyl, isopropyl, butyl, isobutyl, amyl or isoamyl groups; the 2-chloro-, 2-bromo-, 2-hydroxy-, 2-methoxy-, 2-ethoxy- or 2-cyano-ethyl radicals; the ethoxycarbonyl-methyl radical; the 3-chloro-, 3-hydroxy- or 3-methoxy-propyl groups; the 4-methoxy-butyl radical; the hydroxy-, methoxy- or ethoxy-ethyleneoxy-ethyl groups; and the dimethyl-, diethyl-, bishydroxyethyl-, bismethoxyethyl- or biscyanoethylaminoethyl groups.

If $R_1$ and/or $R_2$ stand for alkenyl groups, these are primarily the vinyl propenyl-(1) or propenyl-(2) groups or a β-phenyl-ethenyl group.

If $R_1$ and/or $R_2$ stand for aralkyl groups, these are preferably benzyl, β-phenyl-ethyl or α-phenyl-propyl radicals which can be substituted by halogen atoms, lower alkyl or alkoxy, carboxy-alkyl or cyano groups.

The aryl radical X is preferably a phenyl radical which can be unsubstituted or mono- or poly-substituted. Examples of substituents are: halogen atoms, such as chlorine, bromine, fluorine; alkyl groups with 1 to 12 carbon atoms, which may in turn be substituted by halogen, alkoxy, cyano or carboxyalkyl radicals; unsubstituted or substituted phenyl or aryloxy groups; alkoxy radicals with 1 to 6 carbon atoms which may in turn be substituted by halogen, alkoxy, cyano or carboxyalkyl groups; esterified carboxy groups, sulphonic acid ester or sulphofluoride groups; trifluoromethyl, acetyl or nitro groups; urethane or urea groups; unsubstituted or substituted sulphonamide radicals; arylazo groups; alkyl or aryl-sulphone radicals; alkyl- or arylthio radicals or β-alkoxy-carbonyl-ethylene groups.

Specific examples of such substituents for the aryl radical X are the methyl, ethyl, propyl, butyl, isobutyl, t-butyl or amyl groups; a methoxy, or ethoxy-methyl group; a β-methoxy- or ethoxy-ethyl radical; a α-methoxy- or ethoxy-propyl group; the methoxy, ethoxy, propoxy, or butoxy radicals; a methoxy-, ethoxy- or propoxy-methoxy or -ethoxy group; the methoxy- or ethoxycarbonyl-methyl or -ethyl groups; the methoxy- or ethoxycarbonyl-methoxy or -ethoxy radicals; a methoxy- or ethoxycarbonylamino group; a N-phenyl- or N-phenyl-N-methyl-sulphonamide radical; a phenylazo group; a methyl- or phenylsulphonyl or -sulphinyl group; a methyl-, ethyl-, or phenylthio radical; or the β-ethoxycarbonyl-ethylene group.

Examples of the novel anthraquinone dyestuffs include the compounds having the following formulas:

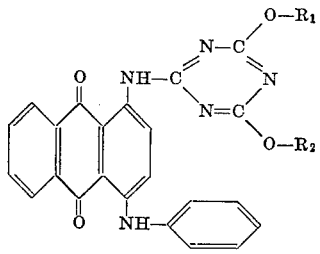

where $R_1=R_2=$—$CH_3$, —$C_2H_5$, n-$C_3H_7$, i-$C_3H_7$, n-$C_4H_9$,
i-$C_4H_9$, n-$C_5H_{11}$, i-$C_5H_{11}$, n-$C_6H_{13}$, —$CH_2$—$CH_2$—Cl
—$CH_2$—$CH_2$—Br, —$CH_2$—$CH_2$—OH
—$CH_2$—$CH_2$—$OCH_3$, —$CH_2$—$CH_2$—O—$C_2H_5$
—$CH_2$—$CH_2$—CN, —$CH_2$—COO—$C_2H_5$, —$(CH_2)_3$—Cl
—$(CH_2)_3$—OH, —$(CH_2)_3$—$OCH_3$, —$(CH_2)_4$—$OCH_3$
—$CH_2$—$CH_2$—O—$CH_2$—$CH_2$—OH
—$CH_2$—$CH_2$—O—$CH_2$—$CH_2$—$OCH_3$
—$CH_2$—$CH_2$—O—$CH_2$—$CH_2$—O—$C_2H_5$
—$CH_2$—$CH_2$—N($CH_3$)$_2$, —$CH_2$—$CH_2$—N($C_2H_5$)$_2$
—$CH_2$—$CH_2$—N($CH_2$—$CH_2$—OH)$_2$
—$CH_2$—$CH_2$—N($CH_2$—$CH_2$—CN)$_2$
—$CH_2$—$CH_2$—N($CH_2$—$CH_2$—$OCH_3$)$_2$, —CH=$CH_2$
—$CH_2$—CH=$CH_2$, —CH=CH—$CH_3$

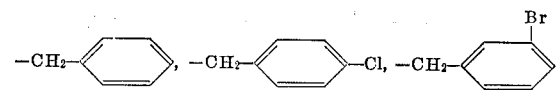

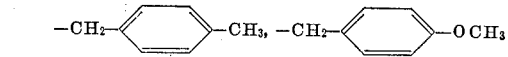

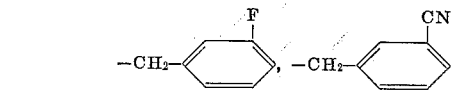

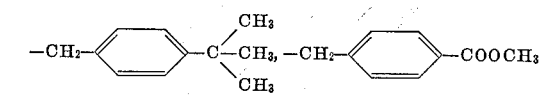

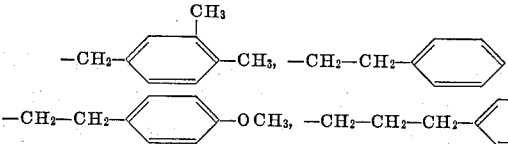

3          4

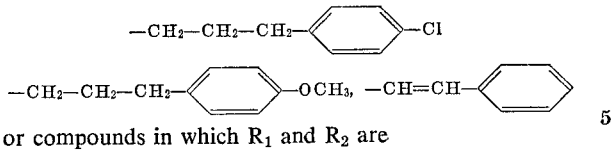

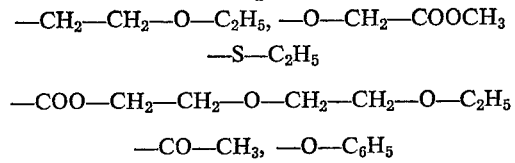

or compounds in which $R_1$ and $R_2$ are

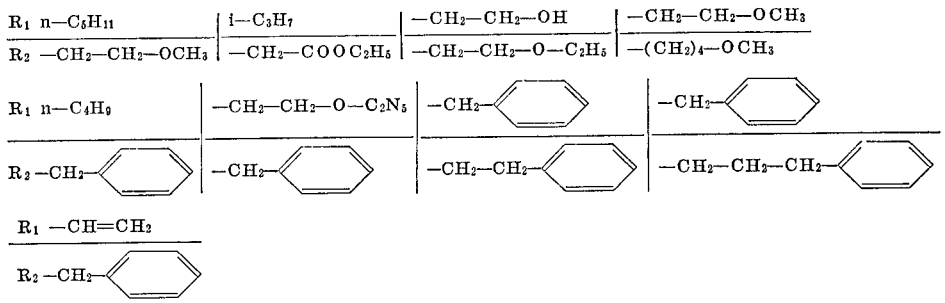

or compounds having the formula:    or

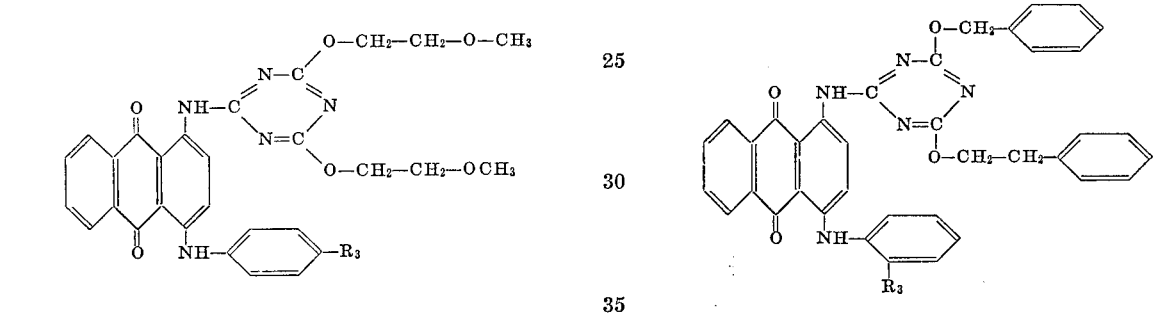

where $R_3$ = —Cl, —Br, —F, —CN, —CH$_3$, —CH$_2$H$_5$,
—i-C$_3$H$_7$, —t-C$_4$H$_9$, —CH$_2$—O—CH$_3$
—CH$_2$—O—C$_2$H$_5$, —CH$_2$—COOCH$_3$
—CH$_2$—CH$_2$—O—CH$_3$, —CH$_2$—CH$_2$—CH$_2$—OCH$_3$
—O—CH$_3$, —O—C$_2$H$_5$, —O—C$_3$H$_7$, —O—C$_4$H$_9$
—O—CH$_2$—O—CH$_3$, —O—CH$_2$—O—C$_2$H$_5$
—O—CH$_2$—COOCH$_3$
—O—CH$_2$—CH$_2$—O—CH$_2$—COOCH$_3$
—NO$_2$, —NH—COOCH$_3$, —SO$_2$—NH—C$_6$H$_5$
—SO$_2$—CH$_3$, —S—CH$_3$, —S—C$_6$H$_5$, —S—CH$_3$
—S—C$_2$H$_5$, —S—C$_6$H$_5$, —CH$_2$—O—CH$_2$
—CH$_2$—O—C$_2$H$_5$, —COO—CH$_3$
—COO—CH$_2$—CH$_2$—O—CH$_3$, —N=N—C$_6$H$_5$
—CH=CH—COOCH$_3$, —O—C$_6$H$_5$ or where $R_3$ = —Cl, —Br, —F, —CH$_3$ —O—CH$_3$, —NO$_2$,
NH—COOCH$_3$, or

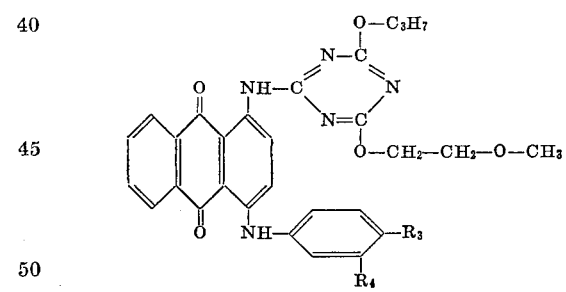

where $R_3$ and $R_4$ are

| $R_3$ | Cl | CH$_3$ | Cl | CH$_3$ | CH$_3$ |
|---|---|---|---|---|---|
| $R_4$ | Cl | CH$_3$ | OCH$_3$ | —CH$_2$—COOCH$_3$ | COOC$_2$H$_5$ | or

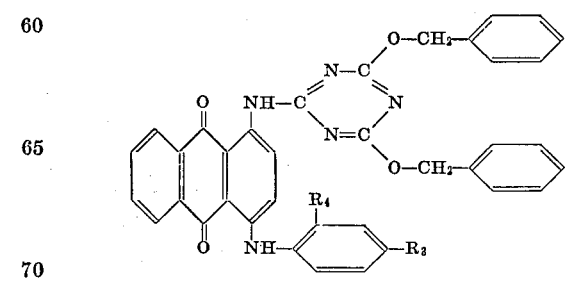

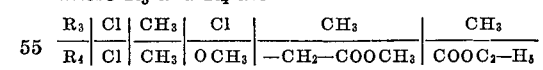

where $R_3$ = —Cl, —Br, —F, CF$_3$, —CO—CH$_3$, —CH$_3$,
—C$_2$H$_5$, —O—CH$_3$, —O—CH$_2$—CH$_2$—O—CH$_3$
—CH$_2$—COOCH$_3$, CN, NO$_2$ —O—CH$_2$—COO—C$_2$H$_5$ where $R_3$ and $R_4$ are

| $R_3$ | CH$_3$ | C$_2$H$_5$ | C$_3$H$_7$ | Cl | Cl |
|---|---|---|---|---|---|
| $R_4$ | CH$_3$ | CH$_3$ | CH$_3$ | NO$_2$ | Cl | or

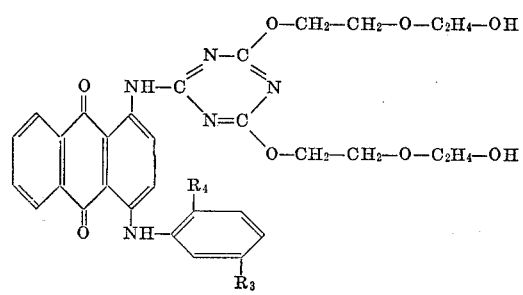

where $R_3$ and $R_4$ are

| $R_3$ | $CH_3$ | $C_2H_5$ | $Cl$ |
|---|---|---|---|
| $R_4$ | $CH_3$ | $CH_3$ | $Cl$ | or

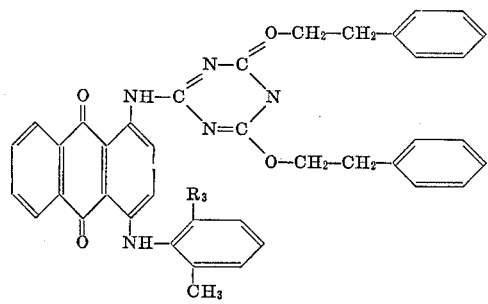

where $R_3 = CH_3, C_2H_5$; or

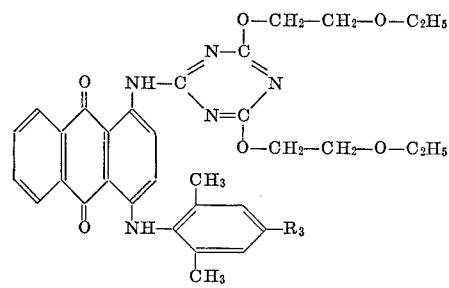

where $R_3 = CH_3, C_2H_5, 1-C_3H_7, t-C_4H_9$.

The dyestuffs of the present invention can be obtained, for example, in known manner by reacting compounds of the formula

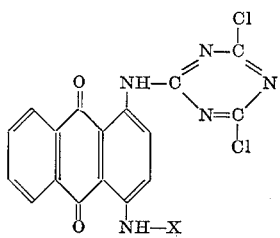

in which X has the same meaning as above, with optionally substituted alkanols, alkenols or aralkanols at 0–150° C. in the presence of an acid-binding agent, for example, the sodium or potassium derivative of an optionally substituted alkanol, alkenol or aralkanol.

Synthetic fibre materials which can be used are primarily linear aromatic polyesters, for example, polyethylene terephthalates or polyesters obtained from 1,4-bis(hydroxymethyl)-cyclohexane and terephthalic acid, or also fibre materials made of polyamides, polyurethanes, polyacrylonitrile, polyolefines or cellulose triacetate.

Dyeing and printing can be carried out by known methods. The dyestuffs are expediently used in a finely dispersed form. When dyeing fibres of polyethylene terephthalate, the usual carriers can be added or the dyeing can be carried out at 120–145° C. under pressure.

Dyeing or printing is preferably carried out according to the thermosol process in which the printed or padded fibre materials are briefly heated, possibly after an intermediate drying, at temperatures of about 180–230°. This heating is generally performed for periods of time ranging from 30 seconds to 2 minutes.

The dyeings and prints obtained with the dyestuffs used according to the invention are characterised by a very good texture, a high dyestuff yield and by excellent fastness to light, thermofixing, washing, rubbing and ironing.

In the following examples the parts means parts by weight unless otherwise stated.

Example 1

(a) A fabric of polyethylene terephthalate fibres is impregnated on a foulard with a liquor containing, per litre, 20 g. 2,4-bis-(p-methoxyethoxy)-6-(4'-phenylamino-1'-anthraquinonylamino) - 1,3,5 - triazine and 10 g. of a thermosol auxiliary, in particular, a polyether. The fabric is then squeezed to a weight increase of 70% and dried in a suspended nozzle drier or drying cabinet at 80–120° C. The fabric is subsequently treated in a stenter or nozzle hot flue with hot air at 190–210° C. for about 45 seconds, then rinsed, reductively after-treated, if desired, then rinsed and dried. The reductive after-treatment to remove dyestuff particles which superficially adhere to the fibres can be carried out by introducing the fabric at 25° C. into a bath containing 3–5 cc./litre of a sodium hydroxide solution of 38% Bé and 1–2 g./litre of concentrated hydrosulphite, heating the bath to 70° C. within about 15 minutes and keeping it at 70° C. for a further 10 minutes. The fabric is then rinsed hot, acidified at 50° C. with 2–3 cc./litre of 85% formic acid, rinsed and dried.

A reddish blue dyeing is obtained which is characterised by a high dyestuff yield, very good texture and excellent fastness properties, particularly by very good fastness to thermofixing, washing, rubbing and light.

An analogous dyeing is obtained when the polyethylene terephthalate fibers are replaced with polyester fibres obtained from 1,4-bis-(hydroxymethyl)-cyclohexane and terephthalic acid. Similarly, a reddish blue dyeing is obtained when the polyethylene terephthalate fibres are replaced with cellulose triacetate fibers and thermosolisation is carried out at 215° C., or when polyamide or polyurethane fibres are used and thermosolisation is carried out at 190–215° C.

(b) A previously cleaned and thermofixed fabric of polyethylene terephthalate fibres is printed with a printing paste which consists of 40 g. of the dyestuff mentioned in Example 1(a), 475 g. of water, 465 g. crystal gum 1:2 and 20 g. of sulphonated caster oil. The crystal gum may also be replaced with an alginate thickener. The printed and dried material is passed over a high capacity stenter or through a condensation apparatus at 190–200° C. in order to fix the dyestuff. The treatment lasts about 30–60 seconds. The fixed print thus obtained is subsequently rinsed cold, soaped with 1–2 g./litre of an anion-active detergent at 70–80° C. for about 10 minutes, rinsed first hot and then cold, and dried.

A print is obtained which corresponds to the dyeing of Example 1(a) and is characterised by the same excellent fastness properties. Similarly, a reddish blue print is obtained when the polyethylene terephthalate fibres are replaced with fibres of cellulose triacetate, polyamide or polyurethane.

(c) 100 parts of polyethylene terephthalate fibres are dyed with 1 part of the finely dispersed dyestuff mentioned in Example 1(a) in 4000 parts of water, in the presence of 15 parts of o-cresotic acid methyl ester as carrier, at 100° C. and pH 4.5 for 1½ hours. A reddish blue dyeing is obtained, which is characterised by very good fastness to washing, thermofixing and light. A similar dyeing is obtained when dyeing is carried out in the absence of a carrier at 125–130° C. for 1 hour.

When 100 parts cellulose triacetate are dyed with 1 part of the finely dispersed dyestuff mentioned in Example 1(a) in 3000 parts of water at 100° C. for 1 hour, a reddish blue dyeing of very good fastness to washing, thermofixing and light is again obtained.

The dyestuff mentioned in Example 1(a) can be prepared as follows: a solution of 7.2 parts of 88.1% potassium hydroxide in 110 parts glycol monomethyl ether is mixed at room temperature, while stirring, with 24.9 parts 2,4 - dichloro-6-(4'-phenylamino-1'-anthraquinonylamino)-1,3,5-triazine, the temperature is allowed to rise, due to the exothermic reaction, to about 50–60° C. and stirring is continued until the dyestuff formation is completed. After cooling, the product which crystallises in the form of dark violet prisms is filtered off with suction, and washed with water; after drying, there are obtained 29 parts 2,4-bis-(β-methoxyethoxy)-6-(4'-phenylamino-1' - anthraquinonylamino) - 1,3,5-triazine, i.e. 96% of theory.

Calc. for $C_{29}H_{27}N_5O_6$ (541.5) (percent): N, 12.93; O, 17.72. Found (percent): N, 12.84; O, 17.61.

Examples 2–17

Reddish blue dyeings or prints of very good fastness to light, washing, rubbing and thermofixing are also obtained when fibres of polyethylene terephthalate, cellulose triacetate, polyamide or polyurethane are dyed according to Example 1(a) or printed according to Example 1(b) with the following dyestuffs which are prepared in analogy with Example 1(d):

| Example: | Dyestuff |
|---|---|
| 2 | 2,4-bis-(methoxy)-6-(4'-phenylamino-1-anthraquinonylamino)-1,3,5-triazine. |
| 3 | 2,4-bis-(n-amyloxy)-6-(4'-phenylamino-1-anthraquinonylamino)-1,3,5-triazine. |
| 4 | 2,4-bis-(β-cyanoethoxy)-6-(4'-phenylamino-1-anthraquinonylamino)-1,3,5-triazine. |
| 5 | 2,4-bis-(ethoxycarbonylmethoxy)-6-(4'-phenylamino-1-anthraquinonylamino)-1,3,5-triazine. |
| 6 | 2,4-bis-(β-hydroxyethoxyethoxy)-6-(4'-phenylamino-1-anthraquinonylamino)-1,3,5-triazine. |
| 7 | 2,4-bis-(β-dimethylaminoethoxy)-6-(4'-phenylamino-1-anthraquinonylamino)-1,3,5-triazine. |
| 8 | 2,4-bis-(β-vinyloxy)-6-(4'-phenylamino-1-anthraquinonylamino)1,3,5-triazine. |
| 9 | 2,4-bis-(β-allyloxy)-6-(4'-phenylamino-1-anthraquinonylamino)-1,3,5-triazine. |
| 10 | 2,4-bis-(benzyloxy)-6-(4'-phenylamino-1-anthraquinonylamino)-1,3,5-triazine. |
| 11 | 2,4-bis-(p-chlorobenzyloxy)-6-(4'-phenylamino-1-anthraquinonylamino)-1,3,5-triazine. |
| 12 | 2,4-bis-(p-methoxybenzyloxy)-6-(4'-phenylamino-1-anthraqinonylamino)-1,3,5-triazine. |
| 13 | 2,4-bis-(p-t-butylbenzyloxy)-6-(4'-phenylamino-1-anthraquinonylamino)-1,3,5-triazine. |
| 14 | 2,4-bis-(β-phenylethoxy)-6-(4'-phenylamino-1-anthraquinonylamino)-1,3,5-triazine. |
| 15 | 2,4-bis-(β-p-methoxyphenylethoxy)-6-(4'-phenylamino-1-anthraquinonylamino)-1,3,5-triazine. |
| 16 | 2,4-bis-(γ-phenylpropoxy)-6-(4'-phenylamino-1-anthraquinonylamino)-1,3,5-triazine. |
| 17 | 2,4-bis-(β-phenylethoxy)-6-(4'-phenylamino-1-anthraquinonylamino)-1,3,5-triazine. |

Example 18

(a) A fabric of polyethylene terephthalate fibres is dyed according to Example 1(a) with a liquor containing 20 g. 2 - (n-amyloxy)-4-(β-methoxyethoxy)-6-(4'-phenylamino-1-anthraquinonylamino)-1,3,5-triazine, and a reddish blue dyeing is thus obtained which exhibits a high dyestuff yield, very good texture and excellent fastness properties, especially very good fastness to thermofixing, washing, rubbing and light. Reddish blue prints are obtained, when polyethylene terephthalate fibres are printed with 2 - (n-amyloxy)-4-(β-methoxyethoxy)-6-(4'-phenylamino - 1 - anthraquinonylamino)-1,3,5-triazine according to Example 1(b), or when the polyethylene terephthalate fibres are replaced with fibres of polyamide, polyurethane or cellulose triacetate.

The dyestuff mentioned in Example 18(a) can be prepared as follows: a solution of 3.5 parts of 88.1% potassium hydroxide in 110 parts glycol monomethyl ether is mixed at room temperature, while stirring, with 24.9 parts 2,4-dichloro-6-(4'-phenylamino-1-anthraquinonylamino) - 1,3,5 - triazine, the 2-chloro-4-(β-methoxyethoxy) - 6-(4' - phenylamino-1-anthraquinonylamino)-1,3,5-triazine, which crystallises after the reaction has subsided and the mixture has cooled, is filtered off with suction and washed with n-amyl alcohol, the product is introduced at room temperature into a solution of 3.7 parts of 88.1% potassium hydroxide in 150 parts of n-amyl alcohol and the mixture is stirred at 80° C. until the dyestuff formation is completed. After cooling, the product which crystallises in the form of violet prisms is filtered off with suction, washed with methanol and water; after drying, there are obtained 29 parts 2-(n-amyloxy)-4-(β-methoxyethoxy)-6-(4'-phenylamino - 1 - anthraquinonylamino)-1,3,5-triazine, i.e. 97% of theory.

Calc. for $C_{31}H_{31}N_5O_5$ (553.5) (percent): N, 12.63; O, 14.44. Found (percent): N, 12.59; O, 14.37.

Examples 19–24

Reddish blue dyeings and prints of very good fastness to washing, rubbing and thermofixing are also obtained when fibres of polyethylene terephthalate, cellulose triacetate, polyamide or polyurethane are dyed according to Example 1(a) or printed according to Example 1(b) with the following dyestuffs prepared in analogy with Example 18(b):

| Example: | Dyestuff |
|---|---|
| 19 | 2-(isopropoxy)-4-(n-hexoxy)-6-(4'-phenylamino-1-anthraquinonylamino)1,3,5-triazine. |
| 20 | 2-(β-ethoxy-ethoxy)-4-(vinyloxy)-6-(4'-phenylamino-1-anthraquinonylamino)-1,3,5-triazine. |
| 21 | 2-(β-hydroxyethoxy-ethoxy)-4-(benzyloxy)-6-(4'-phenylamino-1-anthraquinonylamino)-1,3,5-triazine. |
| 22 | 2-(γ-hydroxypropoxy)-4-(β-phenylethoxy)-6-(4'-phenylamino-1-anthraquinonylamino)-1,3,5-triazine. |
| 23 | 2-(benzyloxy)-4-(γ-phenylpropoxy)-6-(4'-phenylamino-1-anthraquinonylamino)-1,3,5-triazine. |
| 24 | 2 (isobutyl)-4-(p-t-butylbenzyloxy)-6-(4'-phenylamino-1-anthraquinonylamino)-1,3,5-triazine. |

Example 25

(a) A fabric of polyethylene terephthalate fibres is dyed according to Example 1(a) with a liquor containing per litre, 20 g. of a mixture of 2,4-bis-(benzyloxy) and -γ-phenylpropoxy)-6-(4'-phenylamino - 1 - anthraquinonylamino)-1,3,5-triazine, and there is thus obtained a reddish blue dyeing of excellent dyestuff yield, very good texture and outstanding fastness to thermofixing, washing, rubbing and light. Reddish blue prints are obtained, when polyethylene terephthalate fibres are printed with the said dyestuff mixture, or when the polyethylene terephthalate fibres are replaced with fibres of polyamide, polyurethane or cellulose triacetate.

(b) The dyestuff mixture described in Example 25(a) is prepared, for example, as follows: a solution of 21.6 parts of 88.1% potassium hydroxide in 150 parts benzyl alcohol and 175 parts γ-phenylpropyl alcohol is mixed at room temperature with 74.7 parts 2,4-dichloro-6-(4'-phenylamino)-1-anthraquinonylamino)-1,3,5-triazine and the mixture is stirred until the exothermic reaction is completed. After colloing, the blue-violet product is filtered off with suction, and washed with water; after drying, there are obtained 102 parts of a mixture of 2,4-bis-(benzyloxy)- and (γ-phenylpropoxy)-6-4'-phenylamino-1-anthraquinonylamino)-1,3,5-triazine.

Examples 26–31

Reddish blue dyeings and prints of very good fastness to washing, rubbing and the thermofixing are also obtained when fibres of polyethylene terephthalate, cellulose triacetate, polyamide or polyurethane are dyed according to Example 1(a) or printed according to Example 1(b) with the following dyestuff mixtures prepared in analogy with Example 25(b).

Example: Dyestuff mixture consisting of
- 26____ 2,4-bis-(isobutoxy)- and -(β-ethoxy-ethoxy)-6 - 4'phenylamino - 1 - anthraquinonylamino)-1,3,5-triazine.
- 27____ 2,4-bis-(β-cyanoethoxy)- and -(benzyloxy)-6-(4'-phenylamino - 1 - anthraquinonylamino)-1,3,5-triazine.
- 28____ 2,4-bis-(β-allyloxy)-and (β-chloroethoxy)-6-(4' - phenylamino - 1 - anthraquinonyl-amino)-1,3,5-triazine.
- 29____ 2,4-bis-(ethoxycarbonylmethoxy)- and -(γ-methoxypropoxy)-6-(4' - phenylamino-1-anthraquinonylamino)-1,3,5-triazine.
- 30____ 2,4 - bis - (benzyloxy)- and -(p-t-butylbenzyloxy)-6-(4'-phenylamino - 1 - anthraquinonylamino)-1,3,5-triazine.
- 31____ 2,4-bis-(β-phenylethoxy)- and -(β-phenylethenoxy)-6-(4'-phenylamino - 1 - anthraquinonylamino)-1,3,5-triazine.

Example 32

(a) When a fabric of polyethylene terephthalate fibres is dyed according to Example 1(a) with a liquor containing per litre, 20 g. 2,4-bis-(β-methoxyethoxy)-6-(4'-p-methoxy-phenylamino - 1 - anthraquinonylamino) - 1, 3, 5-triazine, a clear blue dyeing is obtained which is characterised by a high dyestuff yield, very good texture and outstanding fastness to light, thermofixing, washing, and ironing. Clear blue prints or dyeings are also obtained when polyethylene terephthalate fibres are printed or dyed according to Example 1(b) or 1(c) with 2,4-bis-(β-methoxy-ethoxy) - 6 - (4'-p-methoxy-phenylamino-1-anthraquinonylamino)-1,3,5-triazine, or when the polyethylene terephthalate fibres are replaced with fibres of polyamide, polyurethane or cellulose triacetate.

(b) The dyestuff mentioned in the present example can be prepared as follows: a solution of 14.5 parts of 86.9% potassium hydroxide in 220 parts of glycol monomethyl ether is mixed at 20–25° C. with 53 parts 2,4-dichloro-6-(4'-p-methoxyphenylamino - 1 - anthraquinonylamino) - 1,3,5 - triazine and the mixture is heated at 80° C. for 1 hour. After cooling, the product which crystallises in the form of blue prisms is filtered off with suction and washed with methanol and water; there are obtained 61 parts 2,4-bis-(β-methoxyethoxy)-6-(4'-p-methoxyphenylamino - 1 - anthraquinonylamino) - 1,3,5-triazine, i.e. 99.5% of theory.

Calc. for $C_{30}H_{29}N_5O_7$ (571.5): N, 12.27; O, 19.63. Found: N, 12.30; O, 19.57.

Examples 33–43

Clear blue dyeings or prints of very good fastness to light, washing, rubbing and thermofixing are also obtained, when fibres of polyethylene terephthalate, cellulose triacetate, polyamide or polyurethane are dyed according to Example 1(a) or printed according to Example 1(b) with the following dyestuffs prepared in analogy with Example 32(b):

Example: Dyestuff
- 33____ 2,4 - bis - (ethoxy)-6-(4'-p-methoxyphenyl-amino - 1 - anthraquinonylamino) - 1,3,5-triazine.
- 34____ 2,4 - bis - (cyclohexoxy) - 6-(4'-p-methoxyphenylamino - 1 - anthraquinonylamino)-1,3,5-triazine.
- 35____ 2,4 - bis - (β-hydroxyethoxy)-6-(4'-p-methoxyphenyl - amino - 1 - anthraquinonylamino)-1,3,5-triazine.
- 36____ 2,4 - bis - [β-(dioxethylamino)-ethoxy]-6-(4' - p - methoxy phenylamino - 1 - anthraquinonylamino)-1,3,5-triazine.
- 37____ 2,4 - bis - (δ - methoxybutoxy) - 6 - (4'-methoxyphenylamino - 1 - anthraquinonylamino)-1,3,5-triazine.
- 38____ 2,4 - bis - (β-bromoethoxy)-6-(4'-p-methoxyphenylamino - 1 - anthraquinonylamino)-1,3,5-triazine.
- 39____ 2,4 - bis - (p-chlorobenzyloxy)-6-(4'-p-methoxyphenylamino - 1 - anthraquinonylamino)-1,3,5-triazine.
- 40____ 2,4 - bis - (m-fluorobenzyloxy)-6-(4'-p-methoxyphenylamino - 1 - anthraquinonylamino)-1,3,5-triazine.
- 41____ 2,4 - bis - (β-p-methoxyphenylethoxy)-6-(4'-p - methoxyphenylamino - 1 - anthraquinonylamino)-1,3,5-triazine.
- 42____ 2,4 - bis - (γ-p-chlorophenylpropoxy)-6-(4'-p - methoxyphenylamino - 1 - anthraquinonylamino)-1,3,5-triazine.
- 43____ 2,4 - bis - (β-phenylethenoxy)-6-(4'-p-methoxyphenylamino - 1 - anthraquinonylamino)-1,3,5-triazine.

Examples 44–101

In the following table there are stated the shades which are obtained when fibres of polyethylene terephthalate, cellulose triacetate, polyamide or polyurethane are dyed according to Example 1(a) or printed according to Example 1(b) with the specified dyestuffs or dyestuff mixtures; the dyestuffs can be prepared in analogy with Example 1(d) or 18(d) and the dyestuff mixtures in analogy with Example 25(b):

| Example | Dyestuff or dyestuff mixture | Shade |
|---|---|---|
| 44 | 2,4-bis-(isopropoxy)-6-(4'-o-methylphenyl-amino-1'-anthraquinonylamino)-1,3,5-triazine. | Blue. |
| 45 | 2,4-bis-(β-methoxyethoxy)-6-(4'-p-methyl-phenylamino-1'-anthraquinonylamino)-1,3,5-triazine. | Do. |
| 46 | 2,4-bis-(β-ethoxyethoxy)-6-(4'-m-methyl-phenylamino-1'-anthraquinonylamino)-1,3,5-triazine. | Do. |
| 47 | 2,4-bis-(n-butoxy)-6-[4'-(2,3-dimethyl-phenylamino)-1'-anthraquinonylamino]-1,3,5-triazine. | Do. |
| 48 | 2,4-bis-(β-propoxyethoxy)-6-[4'-(2,4-di-methylphenylamino)-1'-anthraquinonyl-amino]-1,3,5-triazine. | Do. |
| 49 | 2-(β-methoxyethoxy)-4-(methoxy)-6-[4'-(2,5-dimethylphenylamino)-1'-anthraquinonyl-amino]-1,3,5-triazine. | Do. |
| 50 | 2,4-bis-(benzyloxy)-6-[4'-(2,6-dimethyl-phenylamino)-1'-anthraquinonylamino]-1,3,5-triazine. | Reddish blue. |
| 51 | 2-benzyloxy-4-(β-hydroxyethoxy)-6-[4'-(3,4-dimethylphenylamino)-1'-anthra-quinonylamino]-1,3,5-triazine. | Blue. |
| 52 | 2,4-bis-(n-amyloxy)-6-[4'-(3,5-dimethyl-phenylamino)-1'-anthraquinonylamino]-1,3,5-triazine. | Do. |
| 53 | 2-(β-methoxyethoxy)-4-[n-amyloxy)-6-(4'-(2,4,6-trimethylphenylamino)-1'-anthra-quinonylamino]-1,3,5-triazine. | Reddish blue. |

| Example | Dyestuff or dyestuff mixture | Shade |
|---|---|---|
| 54 | 2,4-bis-(ethoxycarbonylmethoxy)-6-[4'-(2,4,6-triethylphenylamino)-1'-anthraquinonylamino]-1,3,5-triazine. | Do. |
| 55 | 2,4-bis-(benzyloxy)-6-(4'-p-isopropyl-phenylamino-1'-anthraquinonylamino)-1,3,5-triazine. | Do. |
| 56 | 2-(ethoxy)-4-(cyclohexoxy)-6-(4'-p-fluoro-phenylamino-1'-anthraquinonylamino)-1,3,5-triazine. | Do. |
| 57 | 2,4-bis-(n-hexoxy)-6-(4'-o-chlorophenyl-amino-1'-anthraquinonylamino)-1,3,5-triazine. | Do. |
| 58 | 2,4-bis-($\beta$-methoxyethoxy)- and -($\gamma$-propoxy-ethoxy)-6-(4'-m-fluorophenylamino-1'-anthraquinonylamino)-1,3,5-triazine. | Do. |
| 59 | 2,4-bis-($\beta$-hydroxyethoxy-ethoxy)-6-(4'-m-chlorophenylamino-1'-anthraquinonyl-amino)-1,3,5-triazine. | Do. |
| 60 | 2,4-bis-($\beta$-ethoxy-ethoxy)-6-(4'-p-chloro-phenylamino-1'-anthraquinonylamino)-1,3,5-triazine. | Do. |
| 61 | 2,4-bis-($\beta$-phenylethoxy)-6-(4'-m-bromo-phenylamino-1'-anthraquinonylamino)-1,3,5-triazine. | Do. |
| 62 | 2,4-bis-(ethoxy)- and -(n-amyloxy)-6-(4'-m-trifluoromethyl-phenylamino-1'-anthraquinonylamino)-1,3,5-triazine. | Do. |
| 63 | 2,4-bis-($\beta$-p-methoxyphenylethoxy)-6-(4'-o-methoxyphenylamino-1'-anthraquinonyl-amino)-1,3,5-triazine. | Blue. |
| 64 | 2,4-bis-($\beta$-allyloxy)-6-(4'-p-ethoxyphenyl-amino-1'-anthraquinonylamino)-1,3-5, triazine. | Do. |
| 65 | 2,4-bis-($\beta$-phenylethenoxy)-(4'-p-$\beta$-methoxy-ethoxyphenylamino-1'-anthraquinonyl-amino)-1,3,5-triazine. | Do. |
| 66 | 2-(methoxy)-4-($\beta$-ethoxy-ethoxy)-6-(4'-o-$\beta$-methoxyethoxy-phenylamino-1'-anthra-quinonylamino)-1,3,5-triazine. | Do. |
| 67 | 2-(ethoxy)-4-($\beta$-ethoxy-ethoxy-ethoxy)-6-(4'-m-cyanophenylamino-1'-anthraquinonyl-amino)-1,3,5-triazine. | Reddish blue. |
| 68 | 2,4-bis-(cyanoethoxy)-6-(4'-m-nitrophenyl-amino-1'-anthraquinonylamino)-1,3,5-triazine. | Do. |
| 69 | 2,4-bis-(ethoxycarbonylmethoxy)-6-(4'-m-acetylphenylamino-1'-anthraquinonyl-amino)-1,3,5-triazine. | Do. |
| 70 | 2,4-bis-($\beta$-methoxy-ethoxy)-6-(4'-m-ethoxy-carbonylphenylamino-1'-anthraquinonyl-amino)-1,3,5-triazine. | Do. |
| 71 | 2,4-bis-($\beta$-methoxy-ethoxy)-6-(4'-m-propoxy-carbonyl-phenylamino-1'-anthraquinonyl-amino)-1,3,5-triazine. | Do. |
| 72 | 2,4-bis-(ethoxy)-6-(4'-m-butoxycarbonyl-phenylamino-1'-anthraquinonylamino)-1,3,5-triazine. | Do. |
| 73 | 2,4-bis-(methoxy)- and -(ethoxy)-6-(4'-m-$\beta$-hydroxyethoxycarbonyl-phenylamino-1'-anthraquinonylamino)-1,3,5-triazine. | Do. |
| 74 | 2-(methoxy)-4-(n-propoxy)-6-(4'-m-p-methoxy-ethoxycarbonyl-phenylamino-1'-anthraquinonylamino)-1,3,5-triazine. | Do. |
| 75 | 2,4-bis-(methoxy)-6-(4'-m-$\beta$-ethoxy-ethoxy-ethoxycarbonyl-phenylamino-1'-anthraqui-nonylamino)-1,3,5-triazine. | Do |
| 76 | 2,4-bis-($\beta$-ethoxy-ethoxy)-6-(4'-p-methoxy-carbonylethenyl-phenylamino-1'-anthra-quinonylamino)-1,3,5-triazine. | Greenish blue. |
| 77 | 2,4-bis-(methoxy)-6-(4'-m-hexoxycarbonyl-phenylamino-1'-anthraquinonylamino)-1,3,5-triazine. | Reedish blue. |
| 78 | 2,4-bis-($\beta$-cyanoethoxy)-6-(p-$\beta$-ethoxy-carbonylethenyl-phenylamino-1'-anthra-quinonylamino)-1,3,5-triazine. | Greenish blue. |
| 79 | 2,4-bis-(ethoxy)-6-(4'-p-phenyl-azophenyl-amino-1'-anthraquinonylamino)-1,3,5-triazine. | Olive-tinted green. |
| 80 | 2,4-bis-($\beta$-methoxy-ethoxy)-6-(4'-p-phenyl-azophenylamino-1'-anthraquinonyl-amino)-1,3,5-triazine. | Do. |
| 81 | 2,4-bis-(n-amyloxy)-6-(4'-p-phenylazo-phenylamino-1'-anthraquinonylamino)-1,3,5-triazine. | Do. |
| 82 | 2-(benzyloxy)-4-($\beta$-methoxyethoxy)-6-(4' p-ethoxymethyl-phenylamino-1'-anthra-quinonylamino)-1,3,5-triazine. | Reddish blue. |
| 83 | 2,4-bis-($\beta$-ethoxy-ethoxy)-6-(4'-p-propoxy-methylphenylamino-1'-anthraquinonyl-amino)-1,3,5-triazine. | Do. |
| 84 | 2,4-bis-(n-amyloxy)-6-(4'-p-$\beta$-ethoxy-ethoxymethyl-phenylamino-1'-anthra-quinonylamino)-1,3,5-triazine. | Do. |
| 85 | 2,4-bis-(n-propoxy)-6-(4'-p-$\beta$-methoxy-ethoxymethyl-phenylamino-1'-anthra-quinonylamino)-1,3,5-triazine. | Do. |
| 86 | 2,4-bis-(n-propoxy)- and -($\beta$-methoxyethoxy), 6-(4'-p-t-butylphenylamino-1'-anthraquin-onylamino)-1,3,5-triazine. | Do. |
| 87 | 2,4-bis-(benzyloxy)-6-(4'-p-methoxycarbonyl methyl-phenylamino-1'-anthraquinonyl-amino)-1,3,5-triazine. | Do. |
| 88 | 2,4-bis-($\beta$-allyloxy)-6-(4'-p-methoxyethyl-phenylamino-1'-anthraquinonylamino)-1,3,5-triazine. | Do. |
| 89 | 2-(methoxy)-4-($\beta$-p-methoxyphenylethoxy)-6-(4'-p-methoxycarbonylmethoxy-phenyl-amino-1'-anthraquinonylamino)-1,3-5, triazine. | Blue. |
| 90 | 2,4-bis-(ethoxy)-6-(4'-p-phenoxyphenyl-amino-1'-anthraquinonylamino)-1,3,5-triazine. | Do. |
| 91 | 2,4-bis-(n-propoxy)- and -(n-hexoxy)-6-(4'-m-acetylamino-phenylamino-1'-anthraqui-nonylamino)-1,3,5-triazine. | Reddish blue. |
| 92 | 2,4-bis-($\beta$-propoxy-ethoxy)-6-(4'-m-methoxy-carbonylamino-phenylamino-1'-anthra-quinonylamino)-1,3,5-triazine. | Do. |
| 93 | 2,4-bis-(isopropoxy)-6-(4'-m-sulphonamido-phenylamino-1'-anthraquinonylamino)-1,3,5-triazine. | Do. |
| 94 | 2,4-bis-($\beta$-methoxy-ethoxy)-6-(4'-p-methyl-thiophenylamino-1'-anthraquinonylamino)-1,3,5-triazine. | Blue. |
| 95 | 2,4-bis-(isobutoxy)-6-(4'-p-phenylthiophenyl-amino-1'-anthraquinonylamino)-1,3,5-triazine. | Do. |
| 96 | 2,4-bis-($\beta$-hydroxyethoxy)-6-(4'-p-methyl-sulphonyl-phenylamino-1'-anthraquinonyl-amino)-1,3,5-triazine. | Reddish blue. |
| 97 | 2,4-bis-($\beta$-n-butoxy-ethoxy)-6-(4'-p-phenyl-sulphonyl-phenylamino-1'-anthraquinonyl-amino)-1,3,5-triazine. | Do. |
| 98 | 2,4-bis-(ethoxy)-6-(4'-p-ethylthio-phenyl-amino-1'-anthraquinonylamino)-1,3,5-triazine. | Blue. |
| 99 | 2,4-bis-($\gamma$-hydroxypropoxy)-6-(4'-p-benzyl-phenylamino-1'-anthraquinonylamino)-1,3,5-triazine. | Reddish blue. |
| 100 | 2,4-bis-(benzyloxy)-6-(4'-p-ethoxycarbonyl-methoxy-phenylamino-1'-anthraquinonyl-amino)-1,3,5-triazine. | Blue. |
| 101 | 2,4-bis-(n-propoxy)-6-(4',p-$\beta$-methoxy-ethoxycarbonylmethoxy-phenylamino-1'-anthraquinonylamino)-1,3,5-triazine. | Do. |

The foregoing examples have illustrated the preparation of the novel dyestuffs of the present invention and their utilization in the dyeing and printing of synthetic fibre fabrics. It will be apparent that the foregoing specifically illustrated procedures are equally applicable to other dyestuffs coming within the scope of the present invention. Various modifications and embodiments being apparent to those skilled in the art, it is not intended to limit the scope of the invention to the specifically illustrated embodiments.

What is claimed is:

1. An anthraquinone dyestuff having the formula:

wherein $R_1$, $R_2$, or both $R_1$ and $R_2$ contain 1–18 carbon atoms and are selected from the group consisting of alkyl, phenylalkenyl, cyclohexyl, alkenyl, phenylethylene, phenylpropylene, substituted alkyl, substituted alkenyl and substituted phenylethylene or phenylpropylene wherein the substituted radicals contain 3 alkyl substituents or 1 to 2 substituents selected from the group consisting of halogen, hydroxyl, alkoxy, alkyl hydroxyalkyleneoxy, alkoxyalkyleneoxy, alkoxycarbonyl, cyano, amino, alkylamino, hydroxyalkylamino, alkoxyalkylamino and cyanoalkylamino, wherein the alkyl groups in the substituents contain from 1 to 4 carbon atoms; and wherein $R_3$ is selected from the group consisting of hydrogen; halogen; alkyl; substituted alkyl, wherein the substituents are 3 halo members or 1 to 2 components selected from the group consisting of halogen, cyano alkoxy, carboxyalkyl and alkoxyalkoxy; phenyl; phenoxy alkoxy; substituted alkoxy wherein the substituents are selected from the group consisting of halogen, cyano, alkoxy, carboxyalkyl, carbonylamino and alkoxycarboxyalkyl; carboxyalkyl ester; carboxyalkoxyalkyl ester; carboxyalkylcarboxy; carboxyalkylalkoxyalkoxy; sulfonyl methyl ester; sulfonyl phenyl ester; sulfofluoride; acetyl; nitro; cyano; benzyl; urea; urethane; sulfonamido; methyl sulfonamido phenyl sulfonamido; phenylazo; methyl carbonyl; diphenyl sulfinyl; dimethyl sulfinyl; alkylthio; phenylthio; acetylamino; β-alkoxycarbonylethylene and alkoxycarbonylamino wherein the alkyl radicals of $R_3$ contain from 1–12 carbon atoms.

2. The dyestuff of claim 1, wherein $R_1$, $R_2$ or both $R_1$ and $R_2$ are alkyl or substituted alkyl radicals of 1 to 6 carbon atoms.

3. The dyestuff of claim 1, wherein $R_1$, $R_2$ or both $R_1$ and $R_2$ are vinyl, propenyl-1, propenyl-2, or β-phenylethenyl.

4. The dyestuff of claim 1, wherein $R_1$, $R_2$ or both $R_1$ and $R_2$ are benzyl, β-phenylethyl or γ-phenylpropyl.

5. The dyestuff of claim 4, wherein said $R_1$, $R_2$ or both $R_1$ or $R_2$ radicals are substituted by 1 to 3 halogen, lower alkyl, lower alkoxy, carboxyalkyl or cyano radicals.

6. The dyestuff of claim 1 having the composition 2,4-bis-(β-methoxyethyoxy)-6-(4'-phenylamino - 1' - anthraquinonylamino)-1,3,5-triazine.

7. The dyestuff of claim 1 having the composition 2,4-bis-(benzyloxy)-6-(4'-phenylamino - 1' - anthraquinonylamino)-1,3,5-triazine.

8. The dyestuff of claim 1 having the composition 2-(β-methoxyethoxy)-4-(n-amyloxy)-6-(4'-phenylamino-1'-anthraquinonylamino)-1,3,5-triazine.

9. The dyestuff of claim 1 having the composition 2,4-bis-(β-methoxyethoxy)-6-(4'-p-methoxyphenylamino - 1'-anthraquinonylamino)-1,3,5-triazine.

10. The dyestuff of claim 1 having the composition 2,4-bis-(β-methoxyethoxy)-6-(4'-p - methylphenylamino-1'-anthraquinonylamino)-1,3,5-triazine.

References Cited

UNITED STATES PATENTS

| | | | |
|---|---|---|---|
| 2,742,466 | 4/1956 | Randall et al. | 260—249 XR |
| 3,349,089 | 10/1967 | Kazankov et al. | 260—249 |

HENRY R. JILES, Primary Examiner

JOHN M. FORD, Assistant Examiner

U.S. Cl. X.R.

8—39, 40, 55, 57

UNITED STATES PATENT OFFICE
CERTIFICATE OF CORRECTION

Patent No. 3,499,896          Dated March 10, 1970

Inventor(s) Rutger Neeff

It is certified that error appears in the above-identified patent and that said Letters Patent are hereby corrected as shown below:

| COLUMN | LINE | ERROR |
|---|---|---|
| 3 | 6th from the top of page | "$-CH_2-CH_2-O-C_2N_5$" should read --- $-CH_2-CH_2-O-C_2H_5$ ---. |
| 6 | 12 | "means" should read --- mean ---. |
| 6 | 19 | "2,4-bis-(p-methoxyethoxy)-6-(4'-phenyl- " should read --- 2,4-bis-($\beta$-methoxyethoxy)-6-(4'-phenyl- ---. |
| 8 | 71 | "-$\gamma$-phenylpropoxy)-" should read --- -($\gamma$-phenylpropoxy)- ---. |
| 9 | 12 | "colloing" should read --- cooling ---. |
| 10 | 52 | "18(d)" should read --- 18(b) ---. |

UNITED STATES PATENT OFFICE
CERTIFICATE OF CORRECTION

Patent No. 3,499,896　　　　　　　　Dated March 10, 1970

Inventor(s) Rutger Neeff　　　　　　　PAGE - 2

It is certified that error appears in the above-identified patent and that said Letters Patent are hereby corrected as shown below:

| Column | Line | Error |
|---|---|---|
| 11 | Example 68 | "2,4-bis-(cyanoethoxy)-" should read --- 2,4-bis-(β-cyanoethoxy)- ---. |
| 12 | Claim 1, line 62 | "alkyl hydroxyalkyleneoxy" should read --- alkyl, hydroxyalkyleneoxy ---. |
| 12 | Claim 1, line 70 | "cyano alkoxy" should read --- cyano, alkoxy ---. |
| 12 | Claim 1, line 71 | "phenoxy alkoxy;" should read --- phenoxy; alkoxy; ---. |
| 13 | Claim 1, line 3 | "sulfonamido phenyl" should read --- sulfonamido; phenyl ---. |

SIGNED AND SEALED
SEP 22 1970

(SEAL)
Attest:

Edward M. Fletcher, Jr.
Attesting Officer

WILLIAM E. SCHUYLER, JR.
Commissioner of Patents